US010000389B2

(12) United States Patent
Chaiko et al.

(10) Patent No.: US 10,000,389 B2
(45) Date of Patent: Jun. 19, 2018

(54) SYSTEM AND METHOD FOR CONTROLLING FROTHING DURING ATMOSPHERIC LEACHING OF METAL SULPHIDES USING SILICATES

(71) Applicant: FLSmidth A/S, Valby (DK)

(72) Inventors: David J. Chaiko, South Jordan, UT (US); Frank Baczek, Salt Lake City, UT (US); Tom Walters, Murray, UT (US); Sarah (Sally) Rocks, Sandy, UT (US); Gary Roy, Salt Lake City, UT (US); Carlos Eyzaguirre, Draper, UT (US)

(73) Assignee: FLSMIDTH A/S, Valby (DK)

( * ) Notice: Subject to any disclaimer, the term of this patent is extended or adjusted under 35 U.S.C. 154(b) by 0 days. days.

(21) Appl. No.: 15/504,882

(22) PCT Filed: Aug. 27, 2015

(86) PCT No.: PCT/US2015/047259
§ 371 (c)(1),
(2) Date: Feb. 17, 2017

(87) PCT Pub. No.: WO2016/033360
PCT Pub. Date: Mar. 3, 2016

(65) Prior Publication Data
US 2017/0275177 A1     Sep. 28, 2017

Related U.S. Application Data

(60) Provisional application No. 62/042,414, filed on Aug. 27, 2014.

(51) Int. Cl.
*C22B 3/04* (2006.01)
*B03D 1/02* (2006.01)
(Continued)

(52) U.S. Cl.
CPC ............... *C01G 3/12* (2013.01); *B03D 1/028* (2013.01); *C22B 3/04* (2013.01); *C22B 15/0071* (2013.01)

(58) Field of Classification Search
CPC .. C22B 3/04; B03D 2203/02; B03D 2201/04; B03D 1/028
See application file for complete search history.

(56) References Cited

U.S. PATENT DOCUMENTS 2,471,384 A    5/1949  Booth et al.
3,689,249 A *  9/1972  Judd .................... C22B 1/2406
                                                          75/748

(Continued)

FOREIGN PATENT DOCUMENTS

CA    2107963 A1 *  4/1994
WO    9610096 A1    4/1996
WO    9703754 A1    6/1997

OTHER PUBLICATIONS

ProKon. ShowMe Software. Copyright Harold Schwartz. (Year: 1997).*

(Continued)

*Primary Examiner* — George P Wyszomierski
*Assistant Examiner* — Tima Michele McGuthry Banks
(74) *Attorney, Agent, or Firm* — Jeffrey A. Sharp (57) ABSTRACT

A method of controlling frothing during atmospheric or substantially atmospheric leaching of a metal sulfide is disclosed. In some embodiments, the method may comprise the steps of (a) producing a metal sulfide concentrate via flotation; (b) producing a tailings stream via flotation; and, (c) diverting a portion or all of said produced tailings stream to an atmospheric or substantially atmospheric sulfide leach circuit. A metal recovery flowsheet is also disclosed. In some embodiments, the metal recovery flowsheet may comprise a unit operation comprising: (a) a sulfide concentrator com- (Continued)

prising a flotation circuit, the flotation circuit producing a metal sulfide concentrate stream, and a tailings stream; and, (b) an atmospheric or substantially atmospheric metal sulfide leach circuit. The sulfide concentrator may be operatively connected to the atmospheric or substantially atmospheric metal sulfide leach circuit via both of said metal sulfide concentrate stream, and said tailings stream.

5 Claims, 5 Drawing Sheets

(51) Int. Cl.
  *C01G 3/12* (2006.01)
  *C22B 15/00* (2006.01)

(56) References Cited

U.S. PATENT DOCUMENTS

| | | | | |
|---|---|---|---|---|
| 5,316,567 A | * | 5/1994 | Jones | C22L 33/06 423/24 |
| 5,316,751 A | * | 5/1994 | Kingsley | B09C 1/02 423/106 |
| 5,993,635 A | | 11/1999 | Hourn et al. | |
| 6,234,318 B1 | * | 5/2001 | Breau | B03D 1/02 209/164 |
| 2005/0045528 A1 | | 3/2005 | Simmons et al. | |
| 2009/0071296 A1 | | 3/2009 | Hillier et al. | |
| 2014/0044618 A1 | * | 2/2014 | Ostrea | B03D 1/02 423/26 |

OTHER PUBLICATIONS

Dreisinger, D. et al. "A Fundamental Study of the Reductive Leachiing of Chalcopyrite Using Metallic Iron Part I: Kinetic Analysis." Hydrometallurgy vol. 66 pp. 37-57. (Year: 2002).*

Watling, H.R. "Chalcopyrite Hydrometallurgy at Atmospheric Pressure: 1. Review of Acidic Sulfate, Sulfate-Chloride and Sulfate-Nitrate Process Options." Hydrometallurgy vol. 140 pp. 163-180. (Year: 2013).*

Gupta, C. K.; Mukherjee, T. K. Hydormetallurgy in Extraction Processes: vol. II. CRC Press: Boca Raton, Florida. (Year: 2000).*

International Search Report and Written Opinion (Dated Jan. 6, 2016).

* cited by examiner

SYSTEM AND METHOD FOR CONTROLLING FROTHING DURING ATMOSPHERIC LEACHING OF METAL SULPHIDES USING SILICATES

CROSS-REFERENCE TO RELATED APPLICATIONS

This application is a U.S. National stage § 371 application of PCT/US2015/047259, filed on 27 Aug. 2015, which claims priority to U.S. Provisional Patent Application No. 62/042,414, filed on 27 Aug. 2014 and titled: "SYSTEM AND METHOD FOR CONTROLLING FROTHING DURING ATMOSPHERIC LEACHING OF METAL SULPHIDES USING SILICATES". The aforementioned applications are each hereby incorporated by reference in their entirety, for any and all purposes, as if fully set forth herein.

FIELD OF THE INVENTION

Embodiments of the invention relate to equipment and/or processes for improving metal value extraction from metal sulfide ores. In particular, systems and methods for mitigating and/or controlling frothing using silicates are disclosed. Systems and methods for increasing recovery within an atmospheric or substantially atmospheric leach circuit during the leaching of metal sulfide concentrates are also disclosed.

BACKGROUND OF THE INVENTION

Current and past methods of atmospheric metal sulfide leaching can be hindered by the formation or build-up of froth over time within a leach circuit. The froth may, for instance, build up near top portions of a leach reactor, and accordingly, portions of a metal sulfide concentrate which are to be leached, may be displaced from and therefore may leave contact with lixiviant. Accordingly, some ground sulfide particles within a metal sulfide concentrate may not be exposed to lixiviant for the predetermined residence time necessary for complete leaching to occur. It is not uncommon for froth contents, which are displaced from lixiviant, to contain un-leached or partially un-leached particles. Such effects reduce overall leach recovery, and/or may decrease actual leach residence times for floated particles contained within the froth, to below that which is required to achieve complete metal dissolution (e.g., for complete copper dissolution). In short, conventional atmospheric metal sulfide leaching may be impeded by froth formation. Without limiting the scope of this disclosure, it will be understood by those skilled in the art, that the term "atmospheric" or "substantially atmospheric" where used herein may include systems or apparatus within a leach circuit which may negligibly contribute to the overall use of above ambient pressures. For example, without limitation, open-top stirred reactors and pressurizable enclosed stirred-reactors may be present within an atmospheric or substantially atmospheric leach circuit according to some embodiments, without limitation. Without departing from the intent of the invention, the reactor head space may be atmospheric or alternatively pressurized to above ambient pressure to control the head-space gas composition. The pressure may be controlled by temperature or by an applied gas pressure that is above ambient pressure. As will be described hereinafter, in some preferred embodiments, most leaching may occur at atmospheric pressure conditions, and a much smaller amount of leaching may occur at above atmospheric conditions. In some preferred embodiments, a majority of leaching residence time of a metal sulphide particle may occur at atmospheric pressure conditions, and a minimal amount of leaching residence time of a metal sulphide particle may occur above atmospheric conditions. For example, in some non-limiting embodiments, a leach reactor 202, such as the one shown in FIG. 2, may comprise one or more open-top conventional stirred tank reactors (CSTRs), and an optional attrition scrubber (212), such as the one shown in FIG. 2, may comprise one or more enclosed stirred media reactors configured to be pressurized, receive oxygen, and/or contain grinding media, without limitation. In some embodiments, the optional attrition scrubber (212), such as the one shown in FIG. 2, may comprise one or more enclosed high shear stirred reactors configured to be pressurized, receive oxygen, and/or impart shear between particles of a concentrate to be leached using one or more high shear impellers, without limitation. In some embodiments, the one or more high shear impellers may be selected from the group consisting of: a Cowles disperser blade, a sawblade mixing impeller, a dispersion blade, a saw tooth dispersion blade, an angled tooth blade, an ultra-shear dispersion blade, a high flow dispersion blade, and a combination thereof, without limitation.

The processing and purification of metal sulfide-containing ores involves various unit operations, including, without limitations, crushing, grinding, and froth flotation. In the flotation process, surface-active reagents are generally used to selectively alter the wetting characteristics of sulfide mineral surfaces to promote their separation from gangue minerals. The surfactant-modified particles are separated and recovered by virtue of their selective partitioning from the mineral slurry to froth. When the mineral-containing pulp within a flotation cell is aerated, the surface-modified particles have a tendency to attach to the air bubbles, and rise by buoyancy to produce a mineralized froth which is concentrated atop the surface of the agitated, mineral pulp. Various types of froth flotation reagents are commonly used in mineral separations, including collectors, frothers, activators, and depressants.

The appearance of a stable froth is generally the end result of interfacial activity, and involves the action of surface-active species such as surfactants (i.e., amphiphilic molecules) and additionally, or alternatively, fine particles whose surfaces are amphiphilic. Conditions or phenomena which favor the adsorption of amphiphilic species at the liquid/gas interface will generally promote foam stability and frothing. Consequently, electrolyte solutions composed of ions with strong water-structure influence (i.e., positive hydration) such as $SO_4^{2-}$ would likely promote frothing, while ions which weakly influence water structure (i.e., negative hydration) such as $HSO_4^-$ and $SO_3^-$, would likely be less likely to promote frothing. Additionally, high pressures suppress frothing, while atmospheric pressures or below atmospheric pressures favor its formation.

While the generation of a stable froth is used to an advantage in the selective separation and recovery of mineral particles from gangue during froth flotation processes, the appearance of a stable froth in atmospheric leach processes remains problematic. Prior art systems and methods have been proposed to deal with this problem, yet they have produced unintended problems of their own. Accordingly, new improved systems and methods are needed to overcome these problems.

In the hydrometallurgical processing of copper sulfide concentrates, a copper concentrate is typically dispersed in an acidic ferric sulfate leach liquor to bring about dissolution of copper contained in the mineral particles. The leach process produces a pregnant leach solution (PLS) which is then typically treated by a solvent extraction (SX) process to separate and recover the dissolved copper therein. The SX process is followed by electrowinning, in order to produce high-purity copper cathodes.

In some prior art leach processes (U.S. Pat. No. 5,993,635 for example), the flotation concentrate is initially subjected to ultra-fine grinding, followed directly by oxidative leaching under atmospheric conditions. In these methods, the copper is dissolved from the copper-bearing minerals at temperatures below the boiling point of water. Although there may be localized, transient heating to temperatures of 100° C. or slightly higher (due to exothermic chemical reactions), the pulp temperature is inherently limited due to the fact that the system is at atmospheric pressure. Moreover, large amounts of energy must be consumed during pre-leach ultra-fine grinding, in order to reduce particle size distributions within the flotation concentrate to a P80 of less than 20 microns, down to 5 microns.

An oxidizing agent, such as ferric ion, is commonly used to facilitate the copper dissolution reaction. During the course of this chemical reaction, the oxidizing agent (i.e., ferric ion) is reduced from the ferric oxidation state to the ferrous oxidation state. To continue the process until the majority of the copper is recovered from the mineral particles, oxygen or air is sparged into a stirred reactor to continuously oxidize the product ferrous ion back to the +3 ferric oxidation state. In the case of chalcopyrite dissolution, ferric ions are believed to enable the leaching of copper via the following reaction:

$$CuFeS_2 + 4Fe^{3+} = Cu^{2+} + 5Fe^{2+} + 2S°$$

Simultaneous regeneration of the ferric oxidant and maintenance of electroneutrality is believed to proceed via the following reaction:

$$4Fe^{2+} + O_2 + 4H^+ = 4Fe^{3+} + 2H_2O$$

Consequently, acid is consumed during the leaching of chalcopyrite. Similar reactions in which ferric ion acts as an oxidant are known for the leaching of other metal sulfides, including copper, zinc, iron, manganese, nickel, cobalt, etc.

During the course of the atmospheric leach process, crystalline and/or solid phase elemental sulfur (S°) is produced as a reaction product by virtue of the temperatures and oxygen pressures employed. Because the temperatures involved are below the melting temperature of elemental sulfur, the sulfur appears as a crystalline and/or solid phase on the surface of the copper-bearing mineral particles. During the initial stages of the leach process, surfaces of the copper-bearing mineral particles become amphiphilic due to the appearance of the hydrophobic sulfur product. As the leach process progresses, the continued accumulation of elemental sulfur causes surfaces of the copper-bearing particles to become hydrophobic. During the early stages of the leach process, the combination of ultra-fine particle sizes, high surface areas, and the amphiphilic nature of the particle surfaces within the concentrate leads to the formation of a stable, highly mineralized froth. As a result, mineral particles trapped in the froth are significantly less likely to completely leach. During the later stages of the leach process, the accumulated elemental sulfur can also act as a physical barrier (i.e., the mineral particles passivate), thereby inhibiting continued copper dissolution from the mineral particles.

In prior art methods, the presence of flotation reagents has contributed to the problem of excessive frothing during atmospheric leaching processes of metal sulfides. This phenomenon results in metal-containing particles (for instance, copper-containing particles) becoming segregated from the leach liquor and becoming concentrated within the froth layer. This physical segregation can lead to the removal of the particles from the leach solution thereby slowing or inhibiting the copper dissolution process. In extreme cases, especially where the dissolution rate requires rapid oxygenation, frothing can be so vigorous that it becomes difficult to retain the particles within a stirred leach reactor. This leads to reduced actual residence times experienced by mineral particles residing within the leach reactor, and ultimately negatively impacts leach rates and metal (e.g., copper) recovery.

A prior art method to deal with excessive frothing includes the use of a draft tube to encourage remixing of the froth within the leach liquor. Other prior art methods focus on the use of a wetting agent within the initial stages of an atmospheric leach process, for example, Lignosol to inhibit froth stability (as described in U.S. Pat. No. 5,993,635), or calcium lignosulfonate (as described in WO 97/127070). In particular, prior art methods that teach the use of adding an attriting agent (i.e., silica sand), to enhance metal sulfide dissolution within an atmospheric leach reactor, have also necessarily required the addition of an organic defoaming agent in order to control frothing. From these prior art teachings, particulate $SiO_2$, such as quartz and sand, are not effective defoaming agents.

Other prior art methods have similarly used wetting agents (e.g., ammonium lignin sulfonate) to mitigate the effects of sulfur passivation during elevated temperature autoclave leaching of metal sulfides where the elemental sulfur is present in a "liquid" state, rather than in a solid state (see, for example, U.S. Pat. No. 4,192,851). From prior art teachings, it can be reasoned that wetting agents such as lignin sulfonates do not effectively mitigate the effects of sulfur passivation during atmospheric leaching of metal sulfides.

Surfactants that have been found to be useful in dispersing "liquid" elemental sulfur, include, but are not limited to, lignin sulfonates, lignins, tannin compounds such as quebracho, and alkylaryl sulfonates (U.S. Pat. No. 3,867,268). In addition to surfactants, still other prior art methods which aim to promote the dispersion of liquid elemental sulfur, include ground sand, and mineral processing tailings (e.g., U.S. Pat. No. 6,497,745 and U.S. Pat. No. 7,041,152). None of these prior teachings suggest apparatus or methods for defoaming or mitigating frothing in the presence of a crystalline and/or "solid" phase sulfur product (e.g., elemental sulfur product).

A problem with prior art methods, which entail the use of surfactants to solve the problem of sulfur passivation, is the difficulty caused when these surfactants migrate to downstream unit operations, such as solvent extraction (SX) processes. For example, the contamination of an SX circuit by these surfactants can lead to the formation of oil/water emulsions that are difficult to separate, or they may lead to the formation of interfacial cruds that inhibit the interfacial mass transfer of copper. Surfactants, by their ability to adsorb at interfaces, can also interfere with the very copper dissolution reactions they are employed to aid.

OBJECTS OF THE INVENTION

It is, therefore, an object of some embodiments of the present invention, to minimize, mitigate, and/or control frothing within a sulfide leach circuit using silicates, in particular, an atmospheric or substantially atmospheric metal sulfide leach.

It is also an object of some embodiments of the present invention, to reduce and/or eliminate the need for the addition of a superfluous reagent or reagents, into the leach circuit, which might cost money to purchase, ship, and dose, and/or which might compromise downstream processes (e.g., solvent extraction) or negatively impact leach times and/or overall metal recovery.

It is also an object of some embodiments of the present invention, to minimize, mitigate, and/or control frothing within a sulfide leach circuit using silicates which may be readily obtained from an upstream concentrator, thereby obviating the need to purchase, ship, and introduce separate or foreign materials into the leaching circuit or other portions of a metal recovery flowsheet.

It is also an object of some embodiments of the present invention, to utilize portions of otherwise disposed of tailings from an upstream concentrator (e.g., tailings originating from rougher circuit flotation tails), in an atmospheric or substantially atmospheric metal sulfide leach circuit which is downstream from said upstream concentrator, in order to reduce frothing within said metal sulfide leach circuit and/or its negative effects on leach kinetics or recovery.

It is also an object of some embodiments of the present invention, to utilize portions of run-of-mine (ROM) material, which preferably comprises silicates, from upstream of a concentrator (e.g., before froth flotation), in an atmospheric or substantially atmospheric metal sulfide leach circuit which is downstream from said upstream concentrator, in order to reduce frothing within said metal sulfide leach circuit and/or its negative effects on leach kinetics or recovery.

It is also an object of some embodiments of the present invention, to utilize portions of run-of-mine (ROM) material, which preferably comprises silicates, from an upstream concentrator (e.g., before froth flotation, but after grinding), in an atmospheric or substantially atmospheric metal sulfide leach circuit which is downstream from said upstream concentrator, in order to reduce frothing within said metal sulfide leach circuit and/or its negative effects on leach kinetics or recovery.

These and other objects of the present invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A method of controlling frothing during atmospheric or substantially atmospheric leaching of a metal sulfide is disclosed. According to some embodiments, the method may comprise the steps of: (a) producing a metal sulfide concentrate via flotation; (b) producing a tailings stream via flotation; and, (c) diverting a portion or all of said produced tailings stream to an atmospheric or substantially atmospheric sulfide leach circuit. According to some embodiments, the step of diverting a portion or all of said produced tailings stream to an atmospheric or substantially atmospheric sulfide leach circuit may comprise the step of dosing at least one leach reactor and/or at least one attrition scrubber provided within the atmospheric or substantially atmospheric sulfide leach circuit. According to most preferred embodiments, the atmospheric or substantially atmospheric sulfide leach circuit may be maintained at a temperature below the melting point of elemental sulfur ($S°$). According to some preferred embodiments, the at least one attrition scrubber may be configured with oxygen introduction means (e.g., an O2 feed port with control valve). According to some preferred embodiments, the at least one attrition scrubber may comprise a stirred media reactor or a high shear stirred reactor comprising one or a plurality of high shear impellers, without limitation. According to some preferred embodiments, the at least one attrition scrubber may be maintained between 50% and 99% solids, such as between 60% and 90% solids, for example, between 70% and 80% solids, without limitation. According to some embodiments, the tailings stream may comprise one or more of the following: quartz, aluminosilicates, phyllosilicates (including but not limited to chlorite, kaolinite, montmorillonite, palygorskite, talc, vermiculite), micas (including but not limited to biotite, muscovite, phlogopite), feldspars, zeolites, diatomaceous earth, and various combinations thereof, without limitation. The method may further comprise the step of (d) reducing a leach time of said metal sulfide concentrate in the atmospheric or substantially atmospheric sulfide leach circuit. In some embodiments, the step of reducing a leach time of said metal sulfide concentrate in the atmospheric or substantially atmospheric sulfide leach circuit may comprise providing a leach time (e.g., metal sulfide concentrate average residence time) of less than approximately 6 hours to accomplish greater than approximately 95% recovery of a metal from the metal sulfide concentrate. In some embodiments, the step of reducing a leach time of said metal sulfide concentrate in the atmospheric or substantially atmospheric sulfide leach circuit may comprise providing a leach time between approximately 2.5 and approximately 4 hours to accomplish greater than approximately 95% recovery of a metal from the metal sulfide concentrate.

A metal recovery flowsheet is also disclosed. The metal recovery flowsheet may comprise a unit operation comprising: (a) a sulfide concentrator comprising a flotation circuit, the flotation circuit producing a stream of metal sulfide concentrate, and a tailings stream; and, (b) an atmospheric or substantially atmospheric metal sulfide leach circuit. According to some embodiments, the sulfide concentrator may be operatively connected to the atmospheric or substantially atmospheric metal sulfide leach circuit via both of said metal sulfide concentrate stream, and said tailings stream. According to some embodiments, the atmospheric or substantially atmospheric metal sulfide leach circuit may comprise one or more leach reactors, and silicates contained within said tailings stream may be provided to one or more leach reactors. According to some embodiments, the atmospheric or substantially atmospheric metal sulfide leach circuit may comprise one or more attrition scrubbers, and silicates contained within said tailings stream may be provided to the one or more attrition scrubbers. According to some embodiments, silicates contained within said tailings stream may be provided to the both of said one or more leach reactors and said one or more attrition scrubbers. According to some embodiments, silicates contained within said tailings stream may be provided to either of said one or more leach reactors or said one or more attrition scrubbers. In some embodiments, one or more attrition scrubbers may be provided in series with said one or more leach reactors (i.e., an "inter-stage" configuration), without limitation. In some embodiments, one or more attrition scrubbers may be provided in parallel with said one or more leach reactors (i.e., an "inter-stage" configuration), without limitation. In some embodiments, one or more attrition scrubbers may be provided both in parallel with said one or more leach reactors (i.e., an "inter-stage" configuration), and in series with said one or more leach reactors, without limitation. In some embodiments, at least one attrition scrubber may be shared by at least two leach reactors. In some embodiments, silicates contained within said tailings stream which are delivered to the atmospheric metal sulfide leach circuit may comprise one or more of the following: quartz, aluminosilicates, phyllosilicates (including but not limited to chlorite, kaolinite, montmorillonite, palygorskite, talc, vermiculite), micas (including but not limited to biotite, muscovite, phlogopite), feldspars, zeolites, diatomaceous earth and various combinations thereof, without limitation.

A method of controlling frothing during atmospheric or substantially atmospheric leaching of a metal sulfide, may, according to some embodiments, comprise the steps of: (a) producing a metal sulfide concentrate via flotation; (b) producing a stream of run-of-mine (ROM) material; and, (c) diverting a portion of said stream of run-of-mine (ROM) material to an atmospheric or substantially atmospheric sulfide leach circuit being fed with said metal sulfide concentrate. In some embodiments, the step of diverting a portion of said stream of run-of-mine (ROM) material to an atmospheric or substantially atmospheric sulfide leach circuit may comprise: the step of dosing at least one leach reactor and/or at least one attrition scrubber provided within the atmospheric or substantially atmospheric sulfide leach circuit with run-of-mine (ROM) material, and/or the step of controlling said dosing of run-of-mine (ROM) material, without limitation. In some embodiments, the stream of run-of-mine (ROM) material may comprise one or more of the following: quartz, aluminosilicates, phyllosilicates (including chlorite, kaolinite, montmorillonite, palygorskite, talc, vermiculite), micas (including biotite, muscovite, phlogopite), feldspars, zeolites, diatomaceous earth, and various combinations thereof, without limitation. In some embodiments, the method may further comprise the step of: (d) reducing a leach time (e.g., metal sulfide concentrate average residence time) of said metal sulfide concentrate in the atmospheric or substantially atmospheric sulfide leach circuit. In some embodiments, the step of reducing a leach time of said metal sulfide concentrate in the atmospheric or substantially atmospheric sulfide leach circuit may comprise a leach time of less than approximately 5 hours to accomplish greater than approximately 95% recovery of a metal from the metal sulfide concentrate. In some embodiments, the step of reducing a leach time of said metal sulfide concentrate in the atmospheric or substantially atmospheric sulfide leach circuit may comprise a leach time between approximately 2.5 and approximately 4 hours to accomplish greater than approximately 95% recovery of a metal from the metal sulfide concentrate. In some embodiments, the method may comprise the step of (d) grinding and/or screening the run-of-mine (ROM) material, prior to the diverting step (c).

A method of controlling frothing during atmospheric or substantially atmospheric leaching of a metal sulfide, may, in some embodiments, comprise the steps of: (a) producing a metal sulfide concentrate via flotation; (b) producing a stream of run-of-mine (ROM) material; (c) grinding the stream of run-of-mine (ROM) material, for example, using a grinding apparatus such as a mill (e.g., ball mill, SAG mill, fine-grinding mill, roller mill, etc.) to produce a stream of ground run-of-mine (ROM) material (e.g., prior to froth flotation); and, (d) diverting a portion of said stream of ground run-of-mine (ROM) material to an atmospheric or substantially atmospheric sulfide leach circuit being fed with said metal sulfide concentrate. According to some embodiments, the step of diverting a portion of said stream of ground run-of-mine (ROM) material to an atmospheric or substantially atmospheric sulfide leach circuit may comprise the step of dosing at least one leach reactor and/or at least one attrition scrubber provided within the atmospheric or substantially atmospheric sulfide leach circuit with run-of-mine (ROM) material, and/or the step of controlling said dosing of run-of-mine (ROM) material, without limitation. In some embodiments, the stream of ground run-of-mine (ROM) material may comprise one or more of the following: quartz, aluminosilicates, phyllosilicates (including chlorite, kaolinite, montmorillonite, palygorskite, talc, vermiculite), micas (including biotite, muscovite, phlogopite), feldspars, zeolites, diatomaceous earth, and various combinations thereof, without limitation. In some embodiments, the method may further comprise the step of: (d) reducing a leach time (e.g., metal sulfide concentrate average residence time) of said metal sulfide concentrate in the atmospheric or substantially atmospheric sulfide leach circuit. In some embodiments, the step of reducing a leach time of said metal sulfide concentrate in the atmospheric or substantially atmospheric sulfide leach circuit may comprise a leach time of less than approximately 5 hours to accomplish greater than approximately 95% recovery of a metal from the metal sulfide concentrate. In some embodiments, the step of reducing a leach time of said metal sulfide concentrate in the atmospheric or substantially atmospheric sulfide leach circuit may comprise a leach time between approximately 2.5 and approximately 4 hours to accomplish greater than approximately 95% recovery of a metal from the metal sulfide concentrate. In some embodiments, the method may comprise the step of: (e) screening the stream of ground run-of-mine (ROM) material, prior to the step (d) of reducing a leach time.

In some embodiments, a metal recovery flowsheet may comprise a unit operation having: (a) a sulfide concentrator comprising a flotation circuit, the flotation circuit producing a metal sulfide concentrate stream; (b) at least one of: a stream of run-of-mine (ROM) material originating from a mine site, a stream of ground run-of-mine (ROM) material originating from a grinding circuit of a sulfide concentrator, and a stream of tailings from said sulfide concentrator; and, (c) an atmospheric or substantially atmospheric metal sulfide leach circuit; wherein the atmospheric or substantially atmospheric metal sulfide leach circuit may be operatively connected to said at least one of a stream of run-of-mine (ROM) material originating from a mine site, a stream of ground run-of-mine (ROM) material originating from a grinding circuit of a sulfide concentrator, and a stream of tailings from said sulfide concentrator. In preferred embodiments, a sulfide concentrator may comprise a copper sulfide concentrator, and a metal sulfide concentrate stream may comprise copper sulfide particles or copper sulfide concentrate.

BRIEF DESCRIPTION OF THE DRAWINGS

To complement the description which is being made, and for the purpose of aiding to better understand the features of the invention, a set of drawings illustrating preferred apparatus and methods of using the same is attached to the present specification as an integral part thereof, in which the following has been depicted with an illustrative and non-limiting character. It should be understood that like reference numbers used in the drawings (if any are used) may identify like components.

In the following, the invention will be described in more detail with reference to drawings in conjunction with exemplary embodiments.

DETAILED DESCRIPTION OF THE INVENTION

The following description of the non-limiting embodiments shown in the drawings is merely exemplary in nature and is in no way intended to limit the inventions disclosed herein, their applications, or uses.

Figure 1:
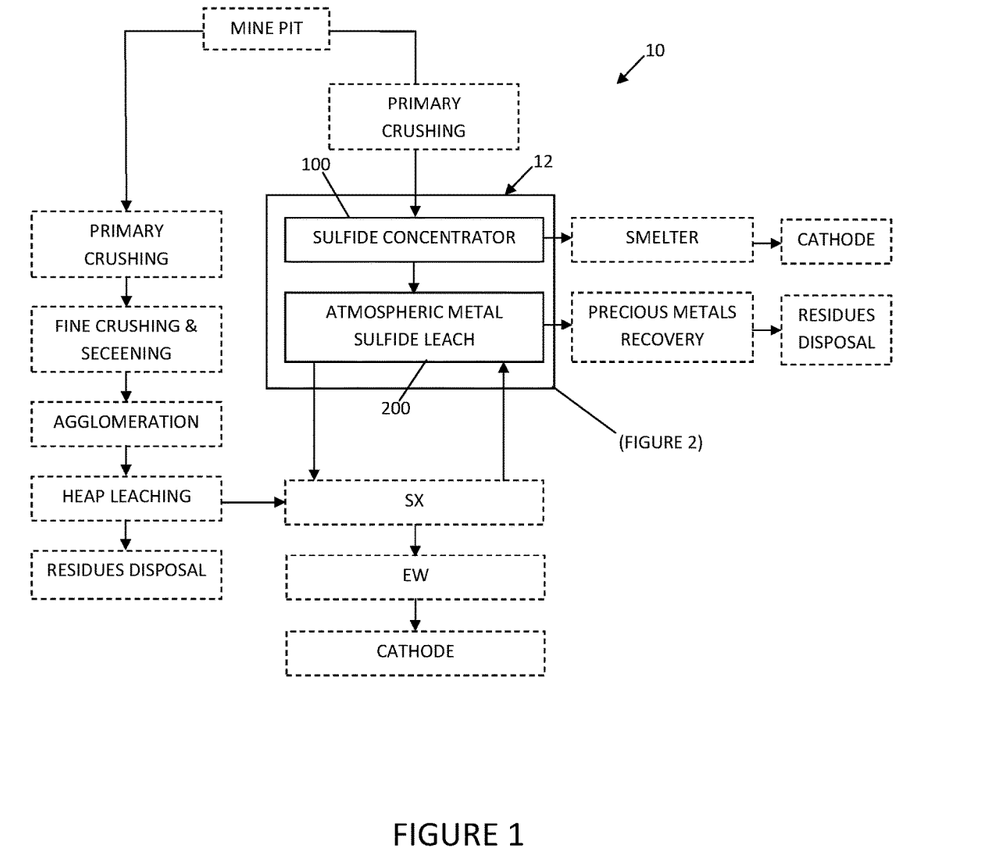
FIG. 1 is a schematic diagram illustrating a non-limiting, exemplary flowsheet according to some embodiments of the invention.

As schematically shown in FIG. 1, embodiments of the invention may comprise a metal recovery flowsheet 10 comprising a unit operation 12 having an atmospheric or substantially atmospheric metal sulfide leach circuit 200 downstream of a sulfide concentrator circuit 100, without limitation. Peripheral flowsheet operations (depicted by boxes with dotted lines) may differ from what is shown.

Figure 2:
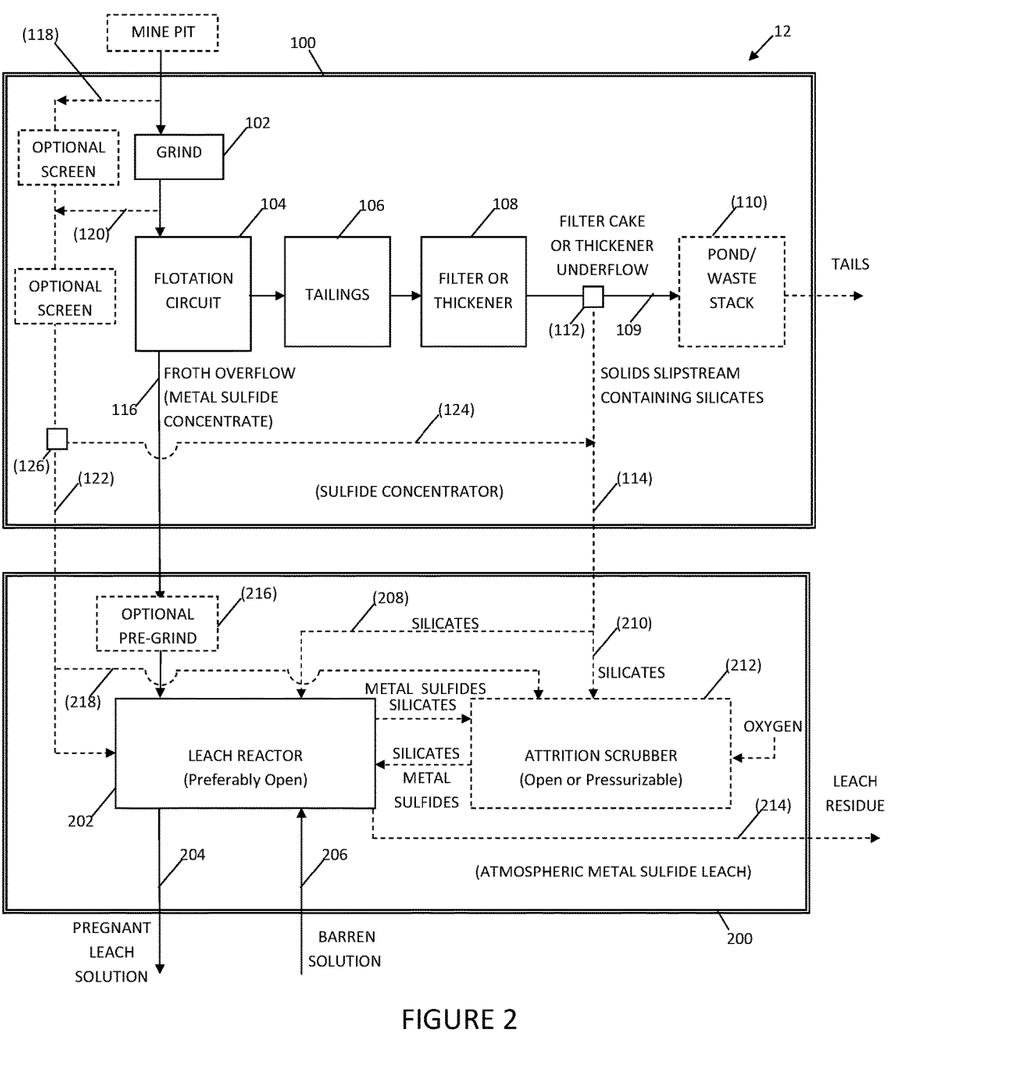
FIG. 2 is a schematic diagram illustrating, in more detail, a unit operation portion of the non-limiting, exemplary flowsheet shown in FIG. 1, wherein dewatered silicates, including clays, may be taken from tailings, and used in an atmospheric or substantially atmospheric metal sulfide leach, according to some embodiments, and/or silicates, including clays, may be taken from run-of-mine (ROM) material or ground run-of-mine (ROM) material, and used in an atmospheric or substantially atmospheric metal sulfide leach circuit, according to some embodiments. The ROM material may be selected or prepared in some way (e.g., via screening, sorting, chemical pre-treating, mechanical pre-treating, and/or isolating low-grade, high-silicate feed), prior to distribution to the atmospheric or substantially atmospheric metal sulfide leach circuit.

As schematically shown in FIG. 2, according to some embodiments, the sulfide concentrator circuit 100 portion of the unit operation 12 may comprise a grinding stage 102, where run-of-mine (ROM) material may be ground and then floated in a flotation circuit 104. Preferably, the run-of-mine (ROM) material may be selected from a substantially tannin-free material, for example, a material lacking organics including, but not limited to top soils, which might contain tannic or humic acids. The flotation circuit 104 may comprise a number of rougher and/or scavenger float cells and may optionally comprise a regrind circuit (not shown), without limitation. Tailings 106 from the flotation circuit 104 may be dewatered, e.g., in a thickener or filter 108, and the dewatered tailings 109 (e.g., thickener underflow and/or filter cake) may be sent to a pond 110 and/or may optionally be sent to an atmospheric or substantially atmospheric metal sulfide leach process 200 as suggested by FIGS. 1 and 2. In some embodiments, the dewatered tailings 109 may comprise silicates of one or more types. A valve, diverter, separation device, splitter, sorter, and/or conveying means 112 may be provided within the sulfide concentrator 100, so that a bleed stream/slipstream 114 may be taken from the dewatered tailings stream 109. A portion of the silicates in the bleed stream/slipstream 114 may be sent to the atmospheric or substantially atmospheric metal sulfide leach circuit 200. For example, silicates may be delivered to a leach reactor 202 (or to multiple leach reactors as suggested in FIG. 4) via a first silicate stream 208, and/or silicates may be delivered to an attrition scrubber 212 (or to multiple attrition scrubbing devices as suggested in FIG. 4) via a second silicate stream 210. Amounts by weight or volume of silicates in each of the first 208 and/or second 210 silicate streams may vary, may differ, or may be similar, for example, according to a process control algorithm. In some embodiments, a leach reactor 202 may be operatively coupled to a attrition scrubber 212 as shown. In some embodiments (not shown), the leach reactor 202 and the attrition scrubber 212 may be combined into one device, without limitation. In some embodiments (not shown), the attrition scrubber 212 may be omitted from the atmospheric or substantially atmospheric metal sulfide leach circuit 200 altogether. If a separate attrition scrubber 212 is utilized in combination with a leach reactor 202, then silicates and metal sulfide particles (e.g., particles to be leached or being leached) may pass back and forth between the leach reactor 202 and the attrition scrubber 212 during leach. An attrition scrubber 212 may be placed in series between two adjacent leach reactors 202 (i.e., in an "inter-stage" circuit arrangement), and/or an attrition scrubber 212 may be place placed in parallel being fed from, and discharging leach concentrate into, the same leach reactor 202 (i.e., in an "intra-stage" circuit arrangement), without limitation.

As shown in FIG. 2 (and suggested in FIG. 4), raw ore, for example in the form of a stream 118 of excavated run-of-mine (ROM) material, which may or may not be sized, screened, or sorted for silicates content, may be provided. Moreover, a stream 120 of ground run-of-mine (ROM) material (e.g., ROM material which has been pulverized by, for example, a ball mill or High Pressure Grinding Roller—HPGR located within a grind circuit 102), may also be provided. The stream 120 of ground run-of-mine (ROM) material may, or may not be sized, screened, or sorted for silicates content. The raw ore in the stream 120 may comprise any one or more of the silicates listed herein. One or more bleed streams/slipstreams 122 of the raw ore containing silicates may be sent to one or more leach reactors 202 in the atmospheric or substantially atmospheric metal sulfide leach circuit 200. In addition to, or instead of the one or more leach reactors 202, the one or more bleed streams/slipstreams 122 of the raw ore containing silicates may be sent to one or more attrition scrubbers 212 in the atmospheric or substantially atmospheric metal sulfide leach circuit 200 (e.g., via optional stream 218). A valve, diverter, separation device, splitter, sorter, or conveying means 126 may be provided to take a bleed stream/slipstream 122 of raw ore containing silicates, and blend it, mix it, or combine it (via connecting stream 124) with a dewatered tailings solids slipstream 114. It should be realized that the inventors anticipate various combinations and permutations of the bleed stream/slipstream configurations shown, in order to provide silicates to one or more portions of an atmospheric or substantially atmospheric metal sulfide leach circuit, without limitation.

Figure 3:
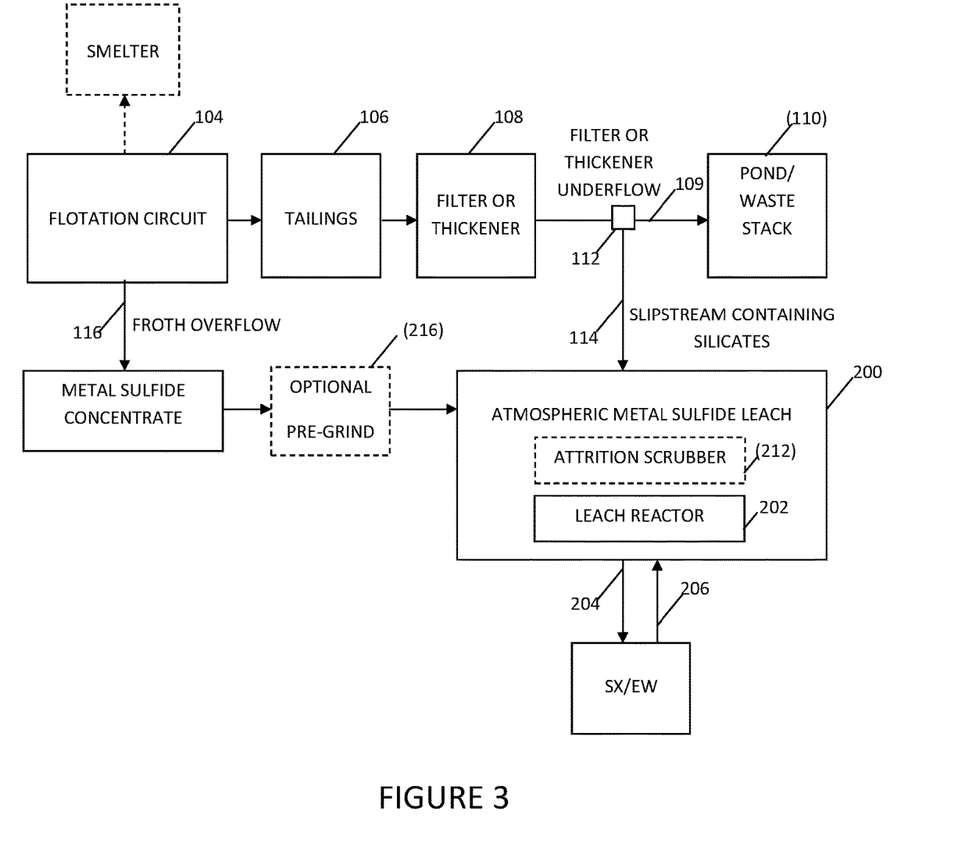
FIG. 3 is a schematic diagram illustrating a system and method of providing silicates (which may include clays), to an atmospheric or substantially atmospheric metal sulfide leach, according to some embodiments.

As schematically shown in FIG. 3, a flotation circuit 104 may send its overflow froth 116, which is comprised of a metal sulfide concentrate, to an optional pre-grind step 216, prior to entering an atmospheric or substantially atmospheric metal sulfide leaching circuit 200. Tailings 106 from the flotation circuit 104 may be dewatered in a thickener or filter 108, wherein liquids (i.e., the thickener overflow or filtrate) from the thickener or filter 108 may be recycled, and wherein some or all of the solids associated with a dewatered tailings stream 109 (e.g., thickener underflow or filter cake) may be diverted, via a valve, diverter, separation device, splitter, sorter, or conveying means 112, to one or more components within the atmospheric or substantially atmospheric metal sulfide leaching circuit 200, such as to one or more leach reactors 202 and/or to one or more optional attrition scrubber devices 212. Silicates contained within the dewatered tailings bleed stream/slipstream 114 extending to the atmospheric or substantially atmospheric metal sulfide leaching circuit 200 may be used as a froth control agent. It will be understood by those skilled in the art that the flotation tailings may contain additional minerals, such as pyrite and metal-bearing sulfides.

Froth overflow 116, produced from the flotation circuit 104, may comprise a metal sulfide concentrate. The metal sulfide concentrate 116 may be optionally ground in an optional pre-grind step 216, before entering the atmospheric or substantially atmospheric, metal-sulfide leach circuit 200. Pregnant leach solution 204 created during atmospheric or substantially atmospheric leaching of the metal sulfide concentrate 116 may be sent from at least one leach reactor 202 and/or from at least one attrition scrubber 212, from within the leaching circuit 200, to a downstream solvent extraction/electrowinning (SX/EW) circuit as shown. Barren liquor/raffinate 206 may be sent back to the at least one leach reactor 202 and/or to the at least one attrition scrubber 212, from the downstream solvent extraction/electrowinning (SX/EW) circuit as shown. Leach residue from the atmospheric or substantially atmospheric metal sulfide leach circuit 200 may be sent to a precious metals recovery circuit and/or ultimately to a leach residues disposal area as suggested by FIG. 1. Alternatively, sulfur contained within leach residue from the atmospheric or substantially atmospheric metal sulfide leach circuit 200 may be processed to supply sulfuric acid to the leach process.

Figure 4:
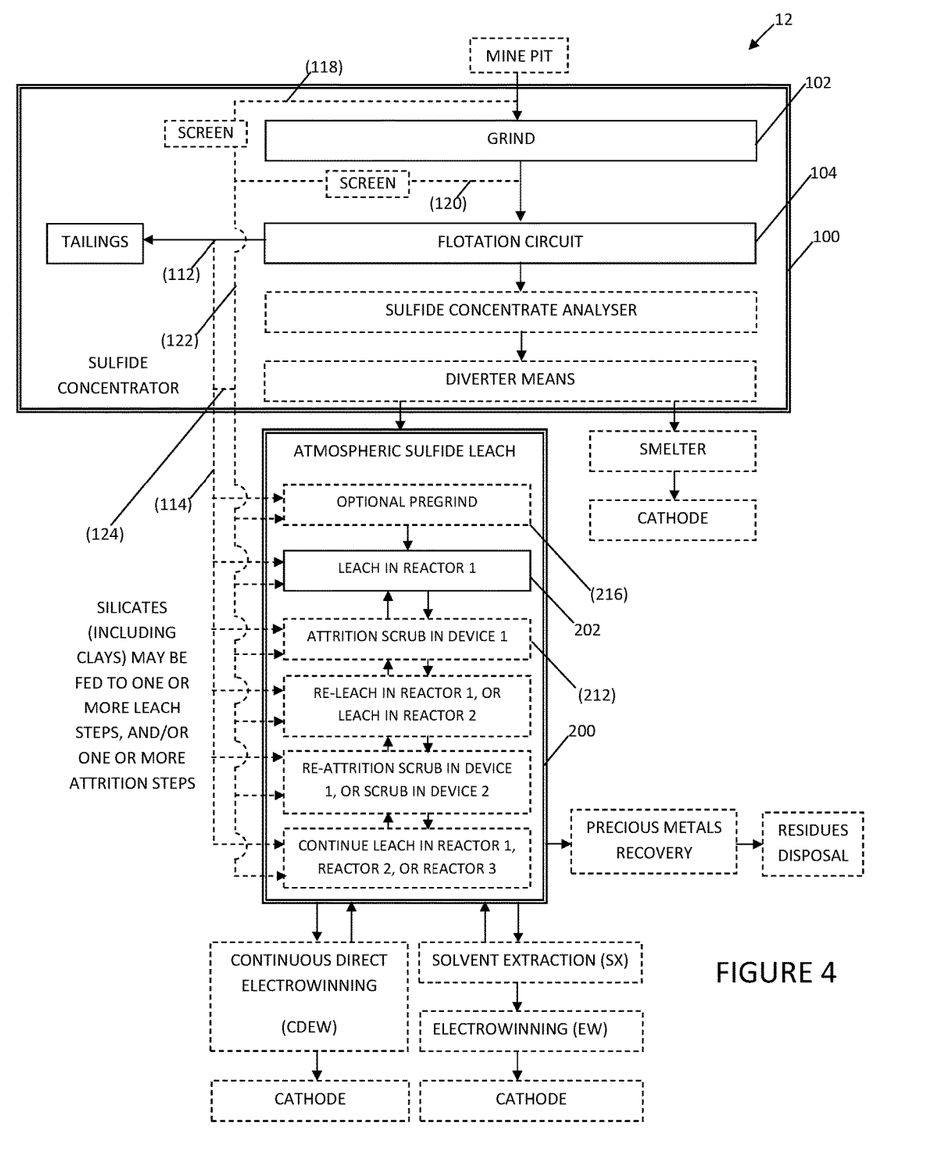
FIG. 4 is a schematic diagram illustrating a system and method of providing silicates (which may include clays), to one or more portions of an atmospheric or substantially atmospheric metal sulfide leach, which may contain one or more attriting devices, according to some embodiments.

FIG. 4 suggests another non-limiting embodiment showing how silicates from froth flotation tailings can be directed from a tailings stream and/or run-of-mine (ROM) material stream, to one or more pieces of equipment within an atmospheric or substantially atmospheric sulfide leach circuit 200. As shown, silicates (including clays) may be added to one or more leach reactors 202 and/or added to one or more optional attrition scrubbers 212, which may be interposed in series between said one or more leach reactors 202 (i.e., "inter-stage"), or which may be disposed in parallel (i.e., "intra-stage) with the one or more leach reactors 202, individually, or collectively, in various combinations, and/or permutations, without limitation. Attrition scrubbing devices 212 shown in FIG. 4 may comprise one or more enclosed high shear stirred reactors configured to be pressurized, receive oxygen, and/or impart shear between particles of a concentrate to be leached using one or more high shear impellers, without limitation. In some embodiments, the one or more high shear impellers may be selected from the group consisting of: a Cowles disperser blade, a sawblade mixing impeller, a dispersion blade, a saw tooth dispersion blade, an angled tooth blade, an ultra-shear dispersion blade, a high flow dispersion blade, and a combination thereof, without limitation. According to some preferred embodiments, the at least one attrition scrubber may be maintained between 50% and 99% solids, such as between 60% and 90% solids, for example, between 70% and 80% solids, without limitation.

Silicates, where described herein, may comprise mineral compounds including one or more of the following, without limitation: quartz, aluminosilicates, phyllosilicates (including but not limited to chlorite, kaolinite, montmorillonite, palygorskite, talc, vermiculite), micas (including but not limited to biotite, muscovite, phlogopite), feldspars, zeolites, diatomaceous earth, and various combinations thereof, without limitation.

In some embodiments, the metal sulfide concentrate (e.g., copper sulfide concentrate) may comprise residual flotation reagents. In some preferred embodiments, the metal sulfide may comprise copper in the form of Chalcopyrite $CuFeS_2$. However, it should be known that other metal-bearing minerals occurring in combination with metal sulfides (e.g., including Acanthite $Ag_2S$, Chalcocite $Cu_2S$, Bornite $Cu_5FeS_4$, Enargite $Cu_3AsS_4$, Tennantite $Cu_{12}As_4S_{13}$, Tetrahedrite $Cu_3SbS_3 \cdot x(Fe, Zn)_6Sb_2S_9$, Galena PbS, Sphalerite ZnS, Chalcopyrite $CuFeS_2$, Pyrrhotite $Fe_{1-x}S$, Millerite NiS, Pentlandite $(Fe,Ni)_9S_8$, Covellite CuS, Cinnabar HgS, Realgar AsS, Orpiment $As_2S_3$, Stibnite $Sb_2S_3$, Pyrite $FeS_2$, Marcasite $FeS_2$, Molybdenite $MoS_2$, Malachite $CuCO_3 \cdot Cu(OH)_2$, Azurite $2CuCO_3 \cdot Cu(OH)_2$, Cuprite $Cu_2O$, Chrysocolla $CuO \cdot SiO_2 \cdot 2H_2O$) may be used with the disclosed systems and methods.

In some embodiments, the atmospheric or substantially atmospheric metal sulfide leach may be maintained below a pH of about 1.3 (e.g., between a pH of about 1 and a pH of about 1.2). Those skilled in the art will know that certain phyllosilicates (e.g., montmorillonite) may be susceptible to rapid attack by strong acid. Accordingly, in instances where a bleed stream/slipstream containing an amount of such clays high enough to become problematic, it may be beneficial to maintain the pH of the leach liquor above about 1 (e.g., between about 1.5 and about 2.5). In some preferred embodiments, the atmospheric or substantially atmospheric metal sulfide leach may be maintained at a temperature which is below the melting point of elemental sulfur, in order to control frothing which might be caused by elemental sulfur. In some preferred embodiments, the atmospheric or substantially atmospheric metal sulfide leach may be maintained at a temperature which is not hot enough to disperse liquid elemental sulfur.

EXAMPLE 1

Figure 5:
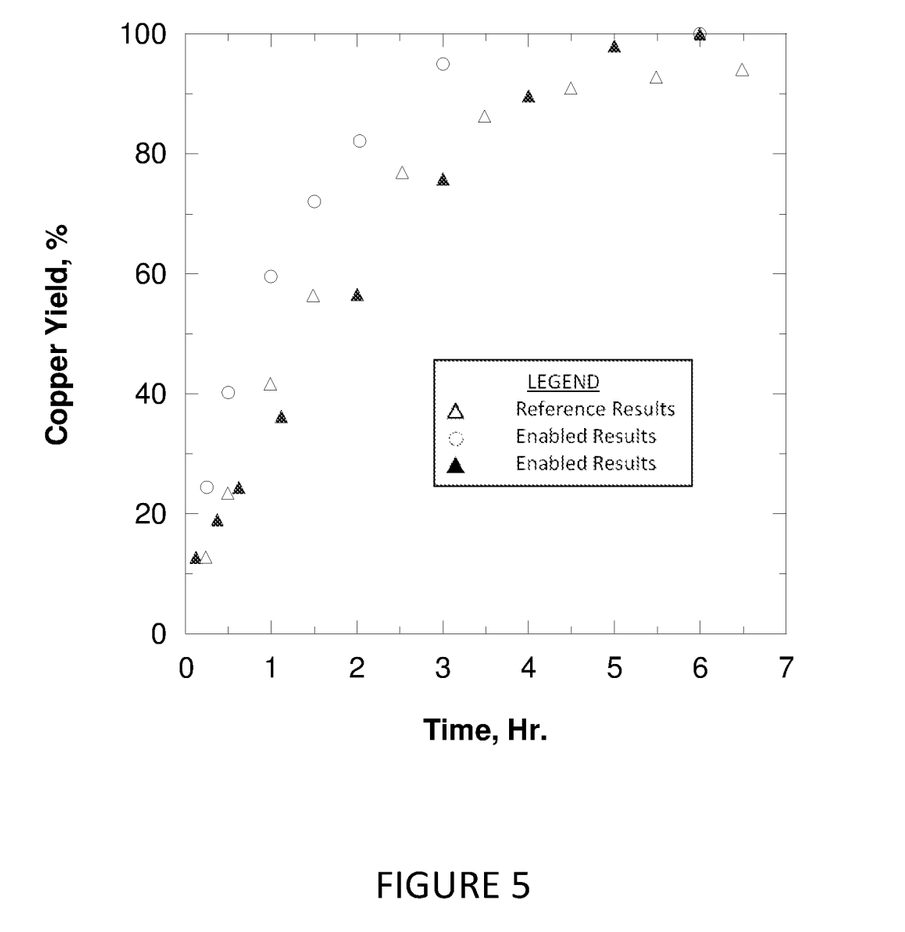
FIG. 5 is a non-limiting graph, illustrating leach results according to some embodiments, which highlights advantages of the system and methods disclosed herein over more conventional practices. In particular, leach results for copper sulfide concentrates are shown in FIG. 5.

A preliminary, experimental test of the effect of recycling silicates for the benefit of reducing frothing and improving leach kinetics and copper recovery during the acid ferric sulfate leaching of chalcopyrite was conducted. The leach tests were conducted at 80° C. under atmospheric pressure. The results of the test are shown in FIG. 5. For the purposes of illustration only, the silicates used in the leach tests were flotation rougher tailings. The rougher tailings material was comprised primarily of pyrite, orthoclase, muscovite, quartz, and albite. This is considered an extreme test of the inventive concept, as the material, by virtue of being a flotation tailings product, would contain residual amounts of flotation reagents (i.e., froth promoting agents) which could possibly hamper leaching. Those skilled in the art will appreciate from the appended drawings and this disclosure, that the silicates could have been alternatively or additionally obtained as a slip stream from the run-of-mine material prior to entering the flotation circuit, thus avoiding any prior exposure to, or contamination by, surface-active froth flotation reagents.

If acid-sensitive clays are determined to be substantially present in the silicates added to a leach vessel 202 or high shear device 212, the use of high acid concentrations during the metal sulfide leaching can lead to dissolution of the clays. The dissolution of aluminosilicates can have a negative impact on metal recovery from a metal sulfide concentrate and acid control may be necessary to achieve metal recoveries of 95% or greater within about 6 hours, and preferably, under about 5 hours, and even more preferably, between about 2.5 hours and about 4 hours, without limitation.

EXAMPLE 2

A comparative test was conducted in which there was no addition of silicates to the leach feed. The leach data associated with no addition of silicates is depicted by the (Δ) symbols in FIG. 5. The P95 particle size distribution of the chalcopyrite concentrate was 35 μm and the test was conducted at 7.5 wt. % suspended solids. The addition of oxygen during the leach process resulted in the production of a large amount of highly mineralized, stable froth within the leach reactor. This resulted in the transfer of a significant amount of solids from the leach liquor to the froth, with the consequence of limiting the copper recovery to between 90-95% at 6 hours (e.g., ~94% at 6 hours as shown on the graph of FIG. 5).

Comparison of the comparative reference test data with the enabled results represented by the (○) symbols shows that the addition the silicates to the leach system increased the copper leach rate significantly (i.e. the initial copper leach rate was approximately 1.83 times faster than the comparative test). In the particular leach test conducted, the volume of froth was also visually significantly less than in the comparative example, and 100% copper recovery was achieved within 6 hrs. The ratio of added silicate tailings to chalcopyrite concentrate was approximately 1.9 to 1.

EXAMPLE 3

A third copper leach test was conducted under identical conditions to the test outlined in Example 2, except that the chalcopyrite concentrate had a P95 of 104 μm. Again, frothing was significantly reduced in relation to the comparative test, and 100% copper recovery was achieved within 6 hours. The reduced frothing meant that the oxygen flow to the reactor could be continuously maintained at a higher rate with the result that the initial copper leach rate was approximately 1.98 times faster than the comparative example.

It should be known that the particular features, processes, and benefits which are shown and described herein in detail are purely exemplary in nature and should not limit the scope of the invention. Although the invention has been described in terms of particular embodiments and applications, one of ordinary skill in the art, in light of this teaching, can generate additional embodiments and modifications without departing from the spirit of or exceeding the scope of the claimed invention. For example, while the inventive concepts, features, and method steps described herein could be advantageously practiced in purely atmospheric leach processes, it is envisaged that the same may be practiced with substantially atmospheric leach circuits comprising equipment (e.g., an attrition scrubber) which may be slightly pressurized (e.g., between 0.01 bar and 10 bar, for example, pressurized around 1-7 bar). For example, and without limitation, the leach reactor 202 shown in FIG. 2 may comprise one or more open-top stirred tank reactors operating under ambient pressure, and the optional attrition scrubber (212) may comprise one or more enclosed stirred media reactors and/or one or more high-shear stirred reactors—each which may comprise oxygen input means and which may be configured to be pressurized (e.g., pressurized to approximately 5 bar) so as to increase oxygen partial pressure therein. In such embodiments, a substantially atmospheric leach circuit may comprise a flowsheet wherein greater than approximately 90% of the residence time of a metal sulfide leach particle occurs in an atmospheric leach reactor 202 (e.g., an open conventional stirred tank reactor) and approximately 10% or less of the residence time of the same metal sulfide leach particle occurs in an above-atmospheric attrition scrubber 212 (e.g., an enclosed stirred media reactor or high shear stirred reactor configured with oxygen introduction means), without limitation.

Accordingly, it is to be understood that the drawings and descriptions herein are offered by way of example to facilitate comprehension of the invention and should not be construed to limit the scope thereof.

What is claimed is:

1. A method of controlling froth formation in a stirred tank leach reactor during atmospheric or substantially atmospheric leaching of a metal sulfide, the method comprising:
   producing a metal sulfide concentrate via overflow from a flotation process;
   producing a tailings stream via underflow of the flotation process;
   feeding the metal sulfide concentrate to the stirred tank leach reactor; the stirred tank leach reactor provided within an atmospheric or substantially atmospheric sulfide leach circuit;
   acid leaching the metal sulfide concentrate in the stirred tank leach reactor of the atmospheric or substantially atmospheric sulfide leach circuit in the presence of the oxygen;
   controlling froth formation within the stirred tank leach reactor of the atmospheric or substantially atmospheric sulfide leach circuit during the step of acid leaching, by diverting a portion of the tailings stream to the stirred tank leach reactor of the atmospheric or substantially atmospheric sulfide leach circuit, and dosing the stirred tank leach reactor with the portion of the tailings stream; and,
   maintaining the stirred tank leach reactor of the atmospheric or substantially atmospheric sulfide leach circuit at a temperature which is below the melting point of elemental sulfur ($S°$).

2. The method of claim 1, wherein the tailings stream comprises one or more of the following: quartz, aluminosilicates, phyllosilicates, chlorite, kaolinite, montmorillonite, palygorskite, talc, vermiculite, micas, biotite, muscovite, phlogopite, feldspars, zeolites, diatomaceous earth, a combination thereof.

3. The method of claim 1, further comprising the step of:
   reducing a leach time of said metal sulfide concentrate in the atmospheric or substantially atmospheric sulfide leach circuit, without adversely affecting metal recovery from the metal sulfide concentrate.

4. The method of claim 3, wherein the step of reducing a leach time of said metal sulfide concentrate in the atmospheric or substantially atmospheric sulfide leach circuit comprises a leach time of less than 5 hours to accomplish a greater than 95% recovery of a metal from the metal sulfide concentrate.

5. The method of claim 4, wherein the step of reducing a leach time of said metal sulfide concentrate in the atmospheric or substantially atmospheric sulfide leach circuit comprises a leach time between 2.5 and 4 hours to accomplish a greater than 95% recovery of a metal from the metal sulfide concentrate.

* * * * *